(12) United States Patent
Fuerhapter et al.

(10) Patent No.: US 6,637,404 B2
(45) Date of Patent: Oct. 28, 2003

(54) METHOD FOR CONTROLLING THE OPERATION OF AN INTERNAL COMBUSTION ENGINE

(75) Inventors: Alois Fuerhapter, Graz (AT); Eduard Unger, Leibnitz (AT)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 10/252,576

(22) Filed: Sep. 24, 2002

(65) Prior Publication Data

US 2003/0062023 A1 Apr. 3, 2003

(30) Foreign Application Priority Data

Sep. 28, 2001 (AT) .......................... 749/2001 U

(51) Int. Cl.⁷ ............................... F02B 31/00
(52) U.S. Cl. ................ 123/305; 123/306; 123/435; 123/90.15; 123/568.14
(58) Field of Search ................. 123/305, 306, 123/435, 90.15, 568.14

(56) References Cited

U.S. PATENT DOCUMENTS 3,924,598 A * 12/1975 Davis .................... 123/306

6,230,683 B1    5/2001 zur Loye et al.
6,530,361 B1 *  3/2003 Shiraishi et al. ........... 123/435

FOREIGN PATENT DOCUMENTS

| DE | 19804988 | 6/1999 |
| DE | 19952096 | 5/2001 |
| WO | 9807973 | 2/1998 |
| WO | 9810179 | 3/1998 |

* cited by examiner

*Primary Examiner*—Erick Solis
(74) *Attorney, Agent, or Firm*—Dykema Gossett PLLC

(57) ABSTRACT

The invention relates to a method for controlling the operation of an internal combustion engine that is operated, in at least one operational range, with a homogeneous charge compression ignition mode, combustion history being monitored and evaluated by measuring at least one parameter relevant to combustion selected from the group comprising the start of combustion, the duration of combustion and the rate of combustion, and at least one parameter relevant to combustion being controlled, for subsequent combustion events, on account of the evaluation of the combustion. In order to stabilize combustion in the homogeneous charge compression ignition mode of operation in the easiest possible way, the inventors propose to vary the level of turbulence in the combustion chamber for the purpose of controlling combustion, the level of turbulence being temporarily raised to stabilize combustion.

14 Claims, 3 Drawing Sheets

METHOD FOR CONTROLLING THE OPERATION OF AN INTERNAL COMBUSTION ENGINE

BACKGROUND OF THE INVENTION

The invention relates to a method for controlling the operation of an internal combustion engine that is operated, in at least one operational range, with a homogeneous charge compression ignition mode, combustion history being monitored and evaluated by measuring at least one parameter relevant to combustion selected from the group comprising the start of combustion, the duration of combustion and the rate of combustion, and at least one parameter relevant to combustion being controlled, for subsequent combustion events, on account of the evaluation of the combustion.

The combustion of an auto-ignited lean fuel-air mixture has the advantage that extremely low $NO_x$ and soot emissions are obtained on account of the homogeneous distribution of concentration and temperature. This process is known as HCCI combustion (Homogeneous Charge Compression Ignition). HCCI combustion results in low $NO_x$ emissions, which is due to the fact that combustion is initiated at multiple ignition sites, the temperature of the combustion process being relatively low as a result thereof. For HCCI combustion, gasoline presents great advantages over diesel fuel on account of its low autoignition quality and the lower boiling range of between approximately 30° and 190°. The compression ratio may be raised to values similar to those in a diesel engine of about 15 to 17.

On a compression-ignited Otto-cycle engine, the timing of ignition of the mixture can no longer be initiated by the actual ignition event occurring at the spark plug as this is the case with a spark-ignited Otto-cycle engine; in this mode of operation, only the in-cylinder charge, and more specifically the composition of the charge in the combustion chamber like pressure, temperature and fuel/air ratio $\lambda$, are important for the commencement of combustion.

Internal combustion engines operating on compression ignition principles rely on increasing the temperature and the pressure in the combustion chamber during the compression phase to ignite the fuel/air mixture. In order for the ignition to indeed take place though, the in-cylinder charge must be conditioned in the right way at the beginning of the compression phase. The compression ratio $\epsilon$ of the internal combustion engine and the mixing temperature $T_{mix}$ of the in-cylinder charge at the time at which all of the gas exchange valves are closed and the compression phase starts thereby substantially influence the start of combustion. A high compression ratio has the advantage that the charge temperatures need not be so high at the beginning of the compression stroke as higher end temperatures can be achieved because of the smaller end volume of compression.

One possibility to influence combustion consists in changing the temperature of the intake air, which substantially influences the temperature of the in-cylinder charge. The fact is that the combustion increasingly approaches the top dead center of ignition as the temperature of the intake air and, as a result thereof, the mixing temperature of the in-cylinder charge at the beginning of the compression phase increases. In order to permit HCCI operation under normal boundary conditions, i.e., at intake air temperatures ranging from about 25° C. to 30° C., very high exhaust gas recirculation rates on the order of more than 50% are required to provide the appropriate initiation conditions for the in-cylinder charge.

DESCRIPTION OF PRIOR ART

The publications WO 98/07973 A1 and WO 98/10179 A2 disclose methods for controlling combustion on internal combustion engines operating under HCCI conditions.

SUMMARY OF THE INVENTION

It is the object of the invention to propose a simple method of controlling the combustion process in an internal combustion engine relying on homogeneous autoignition of a fuel-air mixture for operation.

According to the invention this is achieved by varying the level of turbulence in the combustion chamber to control combustion, the level of turbulence being temporarily raised to stabilize combustion.

In a particularly simple variant of the invention there is provided that, to raise the level of turbulence, the opening timing of at least one intake valve is advanced toward the top dead center position of ignition. The invention thereby makes use of the fact that, when the intake valve opens early, the combustion takes place at a much later stage than it does when the intake valve opens later, with all other parameters kept constant. To stabilize combustion by way of the level of turbulence is particularly suited for a fast change of the operating point in dynamic operation, i.e., for transition from the homogeneous charge spark ignition mode to the homogeneous charge compression ignition mode. A combustion control device making sure that combustion takes place in each engine cycle is provided for this purpose. A parameter relevant to combustion indicative of the situation of the last combustion, preferably the 50% mass fraction burned, is supplied to a combustion control device, and the time when the intake valve is to be opened is primarily influenced to stabilize combustion. Alternatively, it is also possible to achieve the level of turbulence in varying the valve overlap or in varying the valve timing of the exhaust valve.

Furthermore, one of several intake manifolds in each cylinder may be cut off to increase the level of turbulence. It is also possible to activate a swirl adjusting device in the intake manifold for the same purpose of increasing the level of turbulence.

In addition to temporarily increase the level of turbulence, there may also be provided to temporarily activate spark ignition, preferably in a region of a crank angle of approximately 50 degrees to 10 degrees before top dead center, in order to influence the combustion process as spark ignition causes preliminary reactions to take place in the combustion chamber, thus varying the combustion situation.

In order to allow combustion control by means of the combustion stabilizer, characteristic diagrams need to be filed in an engine control device for stationary motor operation, the required mass of exhaust gases to be recirculated and the mass of fresh intake air needed being read out from these diagrams for the corresponding stationary operating point. In the simplest case the diagrams can contain the gas exchange valve parameters such as opening timing and duration of opening for the respective one of the operating points. These characteristic diagrams serve as pilot control and are related to standard ambient conditions. If the temperature differs from the standard ambient temperature, the pilot control is rectified for the angle of opening of the intake valve by means of a characteristic curve of temperature. All other disturbance variables, such as a fast change of the load point for example, are rectified by the combustion control device.

The combustion control device at first detects the actual operating point of the internal combustion engine by way of the actual engine speed and the indicated mean effective pressure measured prior to determining the set value for the combustion situation in the next step. Said set value can be a constant value for the entire operational range or adopt different values in function of the operating point. Next, the angle of the electrical opening of the intake valve obtained at the desired operating point under stationary conditions is read out of a diagram. Thereupon, the value of this angle is rectified by way of a temperature-dependant characteristic curve and is then available as a pilot value for the combustion control device. The control deviation is obtained by means of the reference combustion situation for the stationary case and of the value of the 50% mass fraction burned, which is the mean of z working cycles (wherein z may adopt values comprised between 1 and 10), said control deviation being then delivered to a control device. The level of turbulence in the combustion chamber is increased on account of the control deviation. Once the combustion stabilization is complete, the level of turbulence is restored, in a further step, to the value corresponding to the respective one of the stationary operating points of the engine.

BRIEF DESCRIPTION OF THE DRAWINGS

The invention is explained in more detail herein after with reference to the drawing.

DETAILED DESCRIPTION OF THE PREFERRED EMBODIMENTS

Figure 1:
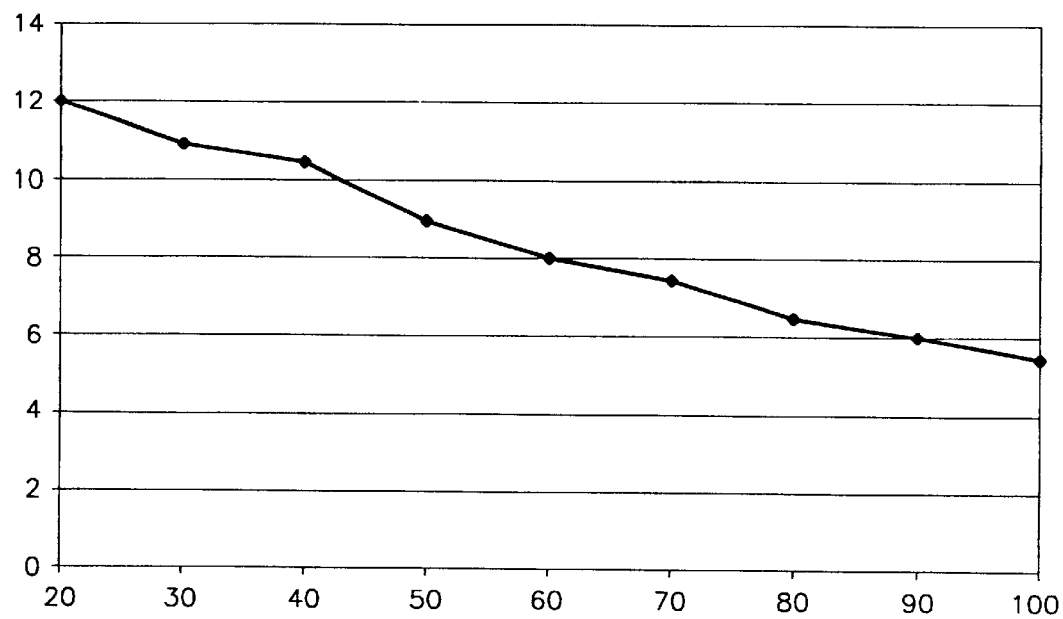
FIG. 1 shows the combustion situation as a function of the temperature of the intake air.

FIG. 1 shows the combustion situation, i.e., the 50% Mass Fraction Burned MFB 50%—measured in crank angle degrees before top dead center BTDC—as a function of the temperature of the intake air T. It thereby appears that combustion steadily approaches the top dead center TDC as the temperature of the intake air T and, as a result thereof, the mixing temperature $t_{mix}$ of the in-cylinder charge at the beginning of the compression phase increases.

The method of the invention makes use of the fact that charge motion, i.e., turbulence, accelerates the combustion process. To vary the opening timing of the gas exchange valves is a very efficient means of influencing the level of turbulence in the combustion chamber.

Figure 2:
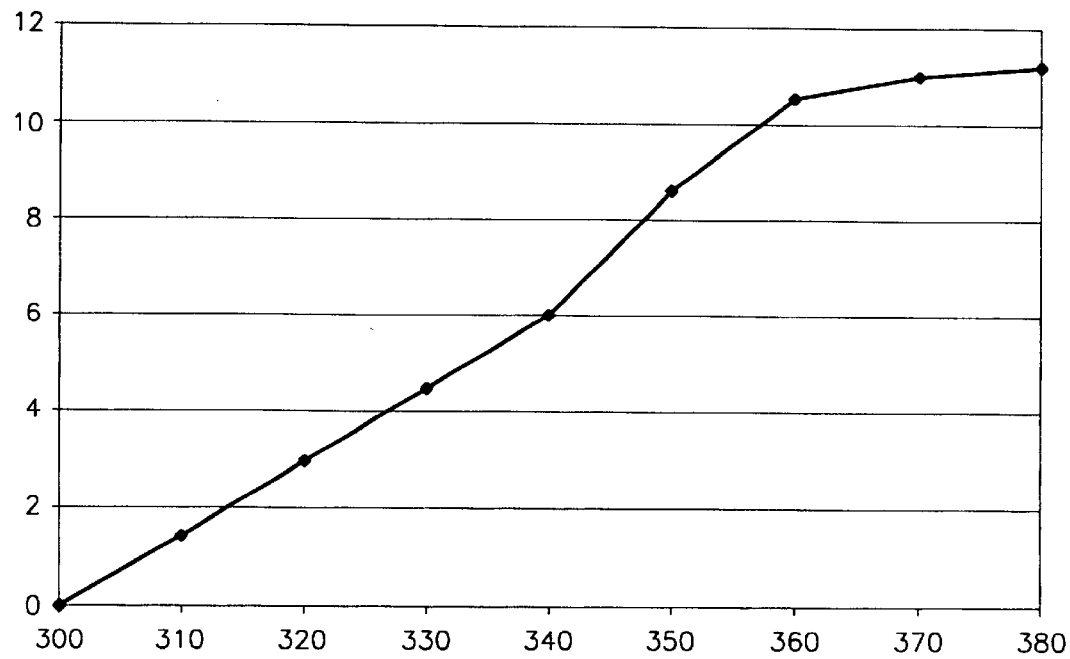
FIG. 2 shows the combustion situation as a function of the angle of the intake valve opening.

FIG. 2 shows the basic influence of the intake valve opening $\alpha_{10}$ in crank angle degrees onto the combustion situation MFB 50%. It appears that, when the intake valve opens early, combustion takes place at a much later stage then when the intake valve opens late, with all other parameters kept constant. The combustion situation and, as a result thereof, the efficiency of the internal combustion engine, can thus be influenced by varying the time of the intake opening. The charge changing can be prevented from being affected when the change of the intake opening performed to increase the turbulence is only a short intervention serving to stabilize combustion.

Figure 5:
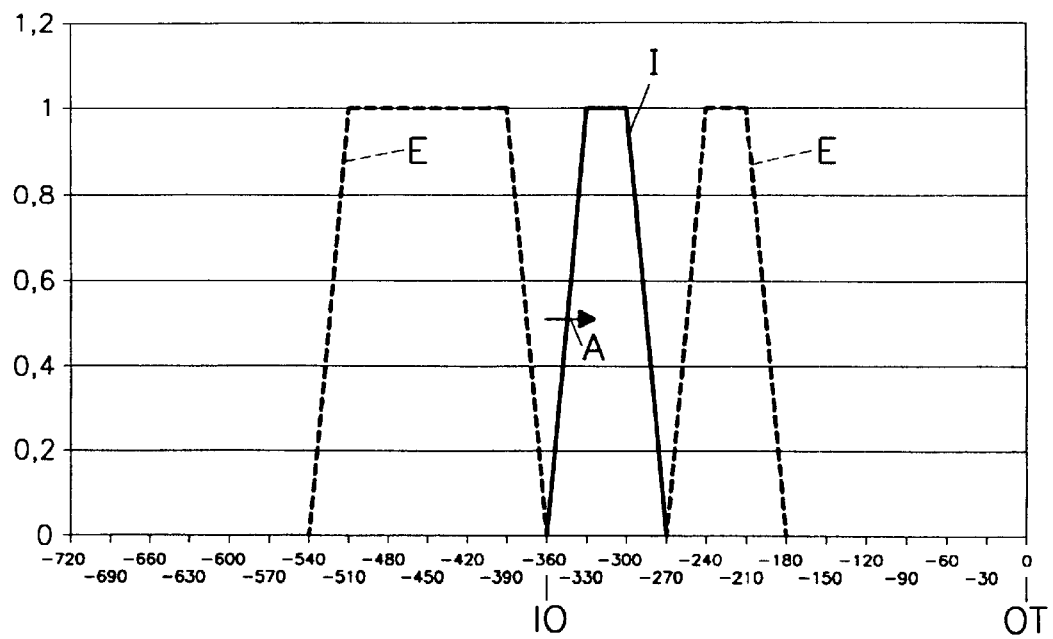
FIG. 5 shows the basic lift profile of the gas exchange valves in HCCI operation and FIG. 6 shows a characteristic diagram of the engine with different operational ranges.

In FIG. 5, the standardized valve lift h is plotted down the side of the diagram, whereas the crank angle α is plotted on the horizontal axis. The valve lift of the intake valves is designated as I and that of the exhaust valves at E. The second valve lift E of the exhaust valves, which is comprised between 270° and 180° serves to recirculate the exhaust gases. Usually, the intake opening IO is comprised between 380 and 360 crank angle degrees before top dead center BTDC. If the intake opening IO is temporarily advanced in the direction of the arrow A toward the top dead center TDC, the level of turbulence in the combustion chamber can be temporarily raised and, as a result thereof, the combustion situation MFB 50% can be advanced, which permits to stabilize combustion. Once stabilization is complete, the intake opening IO can be restored to the value required for the corresponding operating point.

Figure 3:
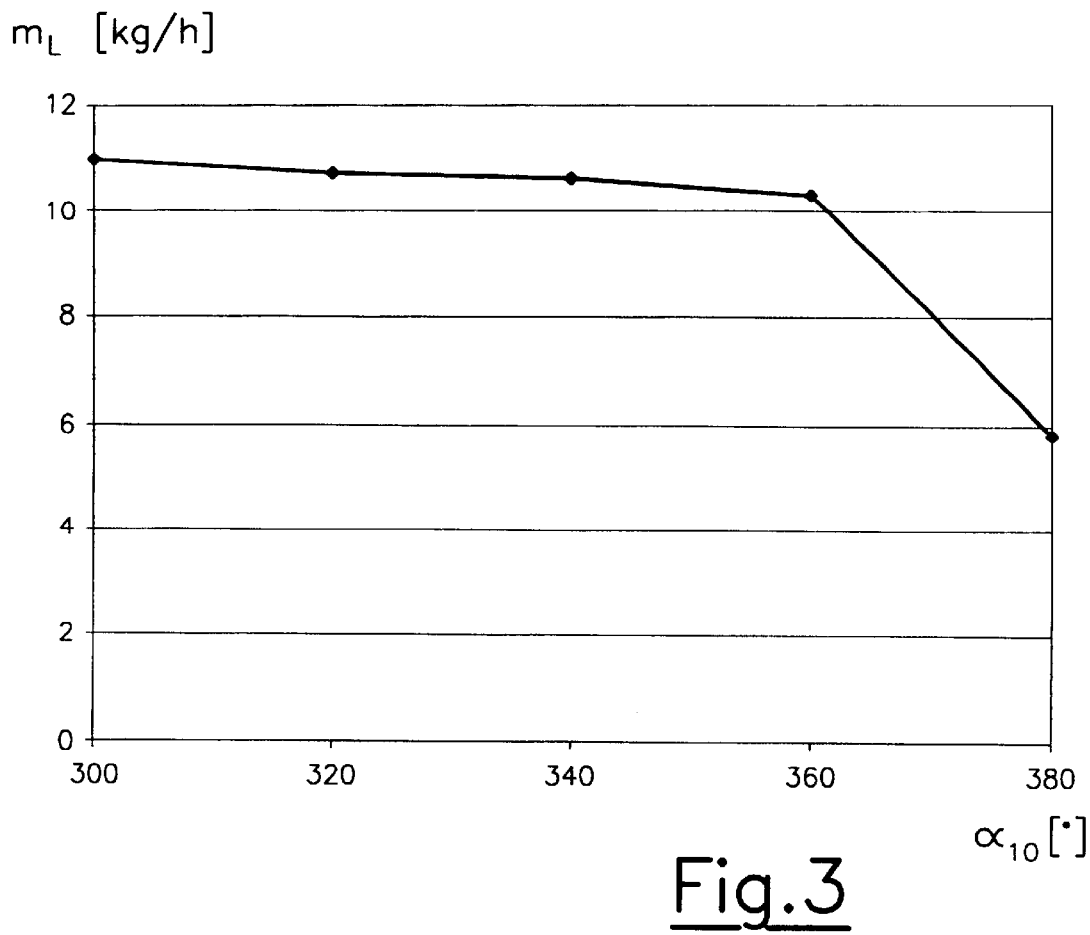
FIG. 3 shows the fresh air mass flow as a function of the angle of the intake valve opening.

As, in adjusting the intake opening IO, the charge is influenced as well, the mass of fresh intake air must also be rectified by way of the duration of the intake opening. FIG. 3 shows by way of example the fresh air filling $m_L$ as a function of the angle of the intake opening $\alpha_{10}$, with the intake valve opening duration kept constant. In all of the Figures that are represented above the angle of the intake opening $\alpha_{10}$, it has to be taken into account that the angles indicated are drive parameters. Therefore, the actual valve opening angles differ from the angles indicated.

Figure 4:
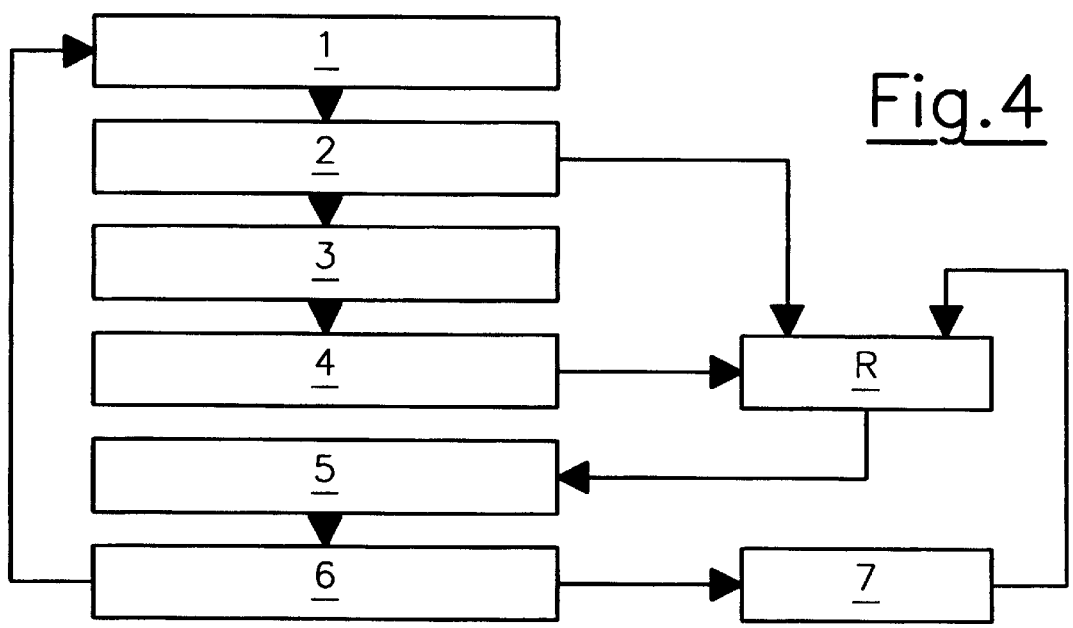
FIG. 4 shows a schematic sequency control of the combustion control device in accordance with the invention.

In order to allow operation of the combustion stabilizer, characteristic diagrams have to be filed for the stationary operation of the engine, the required mass of exhaust gases to be recirculated and the mass of fresh intake air $m_L$ needed being read out from these diagrams for the corresponding stationary operating point. In the simplest case the diagrams can contain the gas exchange valve parameters such as opening timing and duration of opening for the respective one of the operating points. These characteristic diagrams serve as pilot control and are related to standard ambient conditions. If the temperature differs from the standard ambient temperature, the pilot control is rectified by means of the characteristic curve illustrated in FIG. 1. All other disturbance variables such as a fast change of the load point are rectified by the combustion control device R. A flow chart of this combustion control device is shown in FIG. 4.

In step 1, the combustion control device R first detects the actual operating point of the internal combustion engine by way of the actual engine speed n and the indicated effective mean pressure $p_i$ measured, prior to determining, in the next step 2, the set value for the combustion situation MFB 50%. Said set value can be a constant value for the entire operational range or adopt different values in function of the operating point. Next, the angle of electrical opening of the intake valve $\alpha_{10}$ obtained at the desired operating point under stationary conditions is read out of a diagram in step 3. Thereupon, the value of this angle is rectified by way of a temperature-dependant characteristic curve in step 4 and is then available as a pilot value for the combustion control device R. The pilot value is delivered to the valve timing device in step 5. Once combustion is complete, parameters relevant to combustion are detected in step 6 and the mean of these values is taken by way of z working cycles. The control deviation is obtained by means of the reference combustion situation for the stationary operation mode and of the value of the MFB 50%, which is the mean of z working cycles (wherein z may adopt values comprised between 1 and 10), said control deviation being then delivered to the control device R. The output of the control device may be normalized to a signal corresponding to a manipulated variable so that the stationary pilot value of the angle of the intake opening $\alpha_{10}$ is modulated with the output of the control device.

Figure 6:
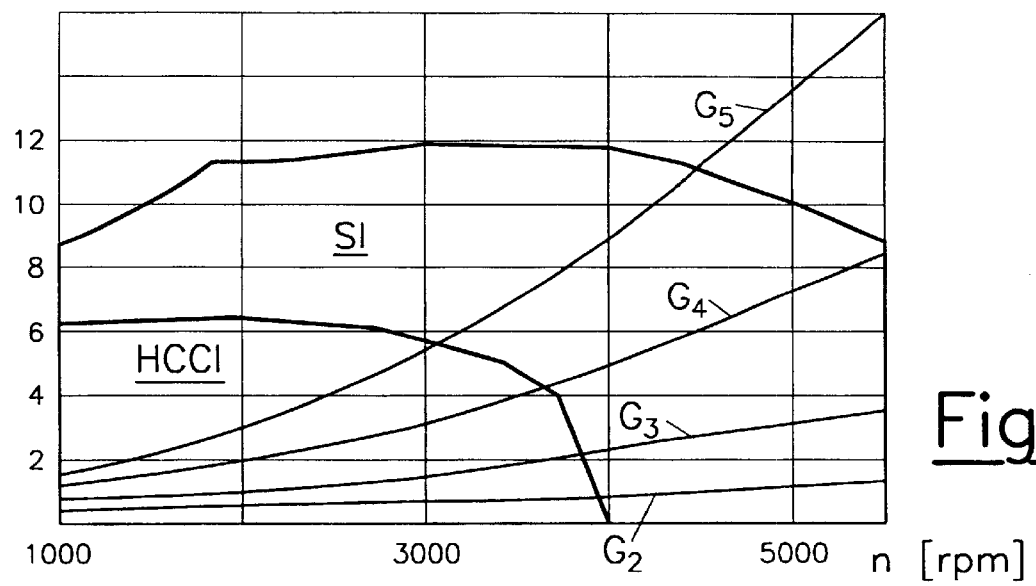

FIG. 6 shows, by way of example, a characteristic diagram of the engine, the indicated cylinder pressure $p_i$ being plotted down the side of the diagram whereas the engine speed n is plotted on the horizontal axis. The homogeneous charge compression ignition mode of operation, HCCI, takes place at low part load. At medium and higher part loads and at full load, the internal combustion engine is operated with a homogeneous charge spark ignition mode. This mode of operation is designated at SI. The lines $G_2$, $G_3$, $G_4$, $G_5$ indicate various gear transmissions.

What is claimed is:

1. A method for controlling the operation of an internal combustion engine that is operated, in at least one operational range, with a homogeneous charge compression ignition mode, combustion history being monitored and evaluated by measuring at least one parameter relevant to combustion selected from the group comprising start of combustion, duration of combustion and rate of combustion, and at least one parameter relevant to combustion being controlled, for subsequent combustion events, on account of the evaluation of the combustion, wherein, to control combustion, the level of turbulence in the combustion chamber is varied, the level of turbulence being temporarily raised to stabilize combustion.

2. The method according to claim 1, wherein, to raise the level of turbulence, the opening timing of at least one intake valve is advanced toward a top dead center position of ignition.

3. The method according to claim 1, wherein, to increase the level of turbulence, one of several intake manifolds in each cylinder is cut off during an intake stroke.

4. The method according to claim 1, wherein a swirl adjusting device is activated in at least one intake manifold for the purpose of increasing the level of turbulence.

5. The method according to claim 1, wherein the level of turbulence is varied in displacing the overlap between an exhaust valve opening and an intake valve opening.

6. The method according to claim 1, at least one exhaust valve being opened during the intake stroke, wherein the level of turbulence is varied by varying the exhaust valve timing during the intake stroke.

7. The method according to claim 1, wherein a spark ignition device is temporarily activated.

8. The method according to claim 7, wherein the spark ignition device is temporarily activated in a range from about 50 to 10 crank angle degrees before top dead center.

9. The method according to claim 1, wherein the parameter relevant to combustion detected is the mass fraction burned 50%.

10. The method according to claim 1, wherein the combustion process is monitored by means of a real-time in cylinder pressure evaluation.

11. The method according to claim 1,
wherein, for a stationary operation of the engine, characteristic diagrams for the quantity of exhaust to be recirculated and for the mass of fresh intake air are filed in an engine control device,
wherein an actual engine speed and an indicated mean effective pressure are detected by means of a combustion control device and an actual operating point of the internal combustion engine is determined,
a set value for the combustion situation being determined and a set value for the angle of opening of at least one intake valve being determined from said combustion situation on account of the actual operating point as compared to a characteristic diagram for the stationary operation of the engine,
and wherein the set value for the angle of opening of the intake valve is rectified by way of a temperature-dependant characteristic curve and this temperature-compensated set value for the angle of opening is used as a pilot value for operating the valve.

12. The method according to claim 11, wherein the mean of an actual combustion situation is taken for a predetermined number of working cycles and wherein said combustion situation is compared to a reference combustion situation stored in the characteristic diagram for the stationary case,
and wherein, on account of a control deviation, the level of turbulence in the combustion chamber is adjusted accordingly.

13. The method according to claim 12, wherein on account of the control deviation, the level of turbulence in the combustion chamber is increased.

14. The method according to claim 12, wherein, once stabilization of combustion is complete, the level of turbulence is restored to a value corresponding to the respective one of the stationary operating points of the engine.

* * * * *